(12) United States Patent
Parikh et al.

(10) Patent No.: US 6,981,209 B1
(45) Date of Patent: Dec. 27, 2005

(54) AUTOMATIC LAYOUT OF VERTICAL FLOW ORIENTED CHARACTERS WITHIN A DEFINED AREA

(75) Inventors: Sujal S. Parikh, Woodinville, WA (US); Grzegorz A. Zygmunt, Bellevue, WA (US); Michel L. Suignard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 09/670,246

(22) Filed: Sep. 26, 2000

(51) Int. Cl.$^7$ ............................................. G06F 17/00
(52) U.S. Cl. ........................ 715/509; 715/504; 707/101
(58) Field of Search .............................. 715/504, 509, 715/517, 521, 503, 518, 519; 707/101

(56) References Cited

U.S. PATENT DOCUMENTS

| | | | | | |
|---|---|---|---|---|---|
| 5,416,898 | A | * | 5/1995 | Opstad et al. ............. | 345/468 |
| 5,835,916 | A | * | 11/1998 | Inaki et al. ................. | 715/509 |
| 6,639,611 | B1 | * | 10/2003 | Leduc ......................... | 715/764 |

OTHER PUBLICATIONS

Chester et al., "Mastering Excel 97", 1997, Fourth Edition, Sybex, Inc., pp. 129-134.*
"International Layout in CSS", Jan. 1999, W3C, pp. 1-40.*
"WSC SVG 1.0 Specification", Aug. 2000, pp. 1-58.*
"International Layout", Sep. 1999, W3C, pp. 1-37.*
Suignard, M., "New International features of Internet Explorer", Microsoft Corporation, 16$^{th}$ International Unicode Conference, Amsterdam, The Netherlands, Mar. 2000.
Sawicki, M., Editor, "International Layout", World Wide Web Consortium Working Draft Sep. 10, 1999.
McKenna, M.G., Sybase, Inc., USA, "Multilingual Databases and Global Internet Integration", 1997.
Raggett, D., "RFC1942" May 1996.
Raggett, D., "HTML 3.2 Reference Specification", W3C Recommendation, Jan., 1997.
Kano, N., "East Meets East: Common Input Method Editor System on Far East Windows", Microsoft Developer Network News, Sep./Oct. 1995.
Kory Srock et al., "Planning for and Testing Global Software", Jul. 1996, Global Software Development Archives.
"International Testing", Apr. 1996, Global Software Development Archives.
"Building for International", Apr. 1996, Global Software Development Archives.
"Vietnamese Code Page", Dec. 22, 1995, Global Software Development Archives.
"Vertical Text Document Layout", Apr. 1996, Global Software Development Archives.
"Input Method Editors", Apr. 1996, Global Software Development Archives.

* cited by examiner

*Primary Examiner*—Sanjiv Shah
(74) *Attorney, Agent, or Firm*—Klarquist Sparkman, LLP

(57) ABSTRACT

The method uses an HTML table cell sizing method designed to measure and layout horizontal HTML table cell elements, and implements a logical view and a search algorithm to layout table cells with the vertical character flow property. The method is also readily adaptable to layout other HTML elements with the vertical character flow property.

30 Claims, 10 Drawing Sheets

Fig. 1--Prior Art
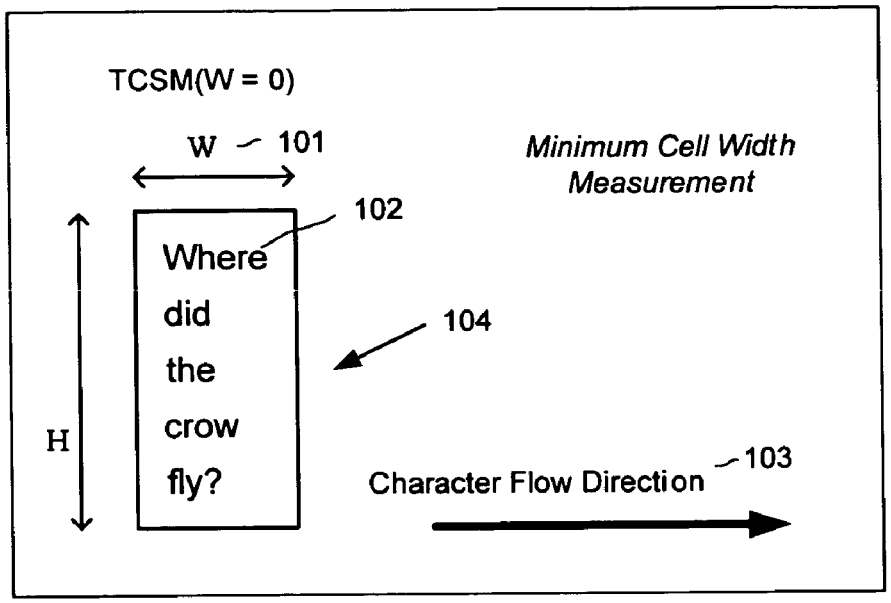
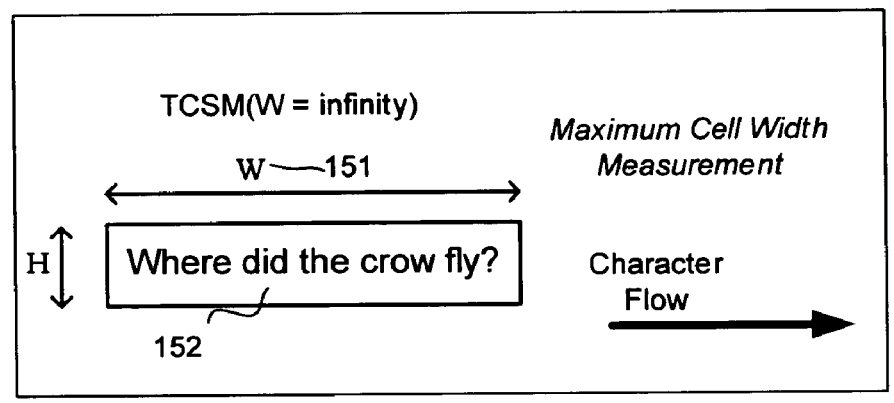
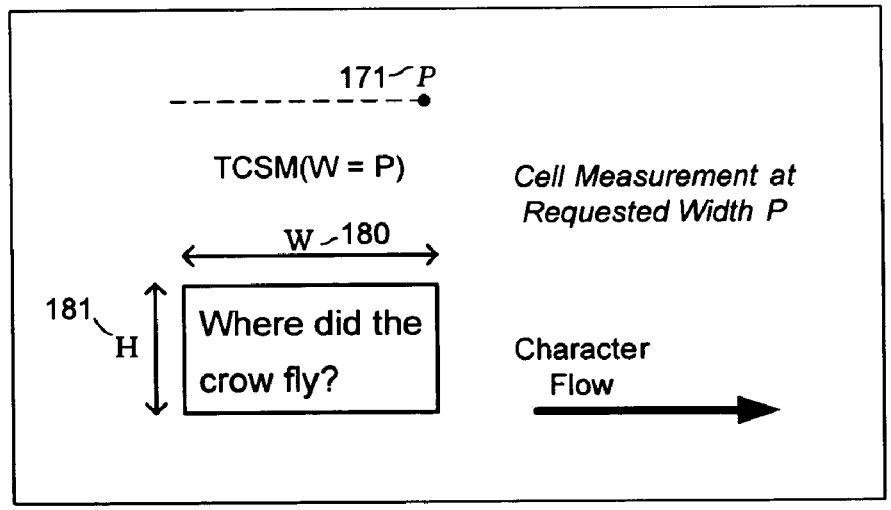

AUTOMATIC LAYOUT OF VERTICAL FLOW ORIENTED CHARACTERS WITHIN A DEFINED AREA

TECHNICAL FIELD

This invention relates to the layout of vertical flow oriented characters within a defined area.

BACKGROUND AND SUMMARY

The Microsoft Internet Explorer web browser includes an HTML engine that draws or renders a web page on a computer display based upon a hyper-text markup language (HTML) file and other included resources that define the web page. Among other elements, these web pages can contain tables that are automatically sized to the available display area.

In auto-sizing HTML table elements, the HTML engine calls a table sizing method (TSM) that determines the table's dimensions and renders the table in the display. The HTML engine gives the TSM an area in which the table may be rendered. The TSM must determine a width for each column in the table so that all columns will fit within the designated area. However, each table cell within a column may have a range of acceptable widths. In FIG. 1, the range of acceptable widths for each table cell begins at a minimum acceptable width 101 and ends at a maximum acceptable width 151.

The TSM requests a minimum and maximum acceptable width for each table cell from a table cell sizing method (TCSM). The TCSM determines the maximum acceptable cell width by flowing the text and graphical content into the table cell with the width set at infinity 101. In horizontal character flow table cells, the width is used by the TCSM to determine how far to let characters flow horizontally from left to right before starting the next horizontal line. With the table cell width set at infinity, each paragraph in the cell is flowed into a separate horizontal line 152. Accordingly, the table cell maximum acceptable width Is generally defined as the width 151 of the longest paragraph when each word of that paragraph is placed in one horizontal line 152.

The TCSM next determines the minimum acceptable cell width by flowing the characters into a cell with the width set to zero 100. At zero width, each word in the cell content is forced onto a separate horizontal line 104. This creates a horizontal line for each word in the cell content. The table cell minimum acceptable width is generally defined as the width of the longest word 102.

Based on these determined minimum 101 and maximum 151 acceptable widths for each individual cell within a column, the TSM will be able to propose a width for that column. The TSM then asks the TCSM to render each table cell within the column at the proposed width (P) 171. The TCSM flows the content into the table cell at the proposed width P 171. The TCSM then measures the resulting height (H) 181 and width (W) 180 of the cell.

A problem arises with this prior table sizing solution, because some foreign languages have vertical character flow instead of horizontal character flow. The existing table cell methodology which was designed for horizontal text 103 does not adequately handle vertical character flow.

In FIG. 1a, table cells with the vertical character flow property, flow from top to bottom 21, instead of from left to right. Therefore, the computation of minimum and maximum acceptable cell widths as performed by the TCSM is incorrect.

Specifically, upon the advent of table cells with the vertical character flow property, the table cells now flow from top to bottom instead of from left to right. Therefore the width input measurements (i.e., infinity, zero, and P) used by the TCSM to control how far table cells flow in the horizontal 'width' direction no longer make sense. Table cells with the vertical character flow property need to know how far to flow characters in the vertical character flow direction 21. Again, vertical table cells need to know the distance to flow characters in the vertical direction.

When the TSM asks the TCSM for minimum and maximum acceptable cell widths for a table cell with the vertical character flow property, the measurements returned by the TCSM are wrong. First, in FIG. 1a, when computing a maximum acceptable table cell width with the existing methodology, the TSM calls the TCSM with the width at infinity. The vertical table cell interprets this as a request to vertically flow the table cell for a character flow distance (CFD) 22 equal to infinity. Since the character flow direction 21 is vertical, each paragraph in the content is flowed into a single vertically line. This creates a smaller table cell width 19, not the desired maximum acceptable table cell width.

Second, when computing a minimum acceptable table cell width, the TSM calls the TCSM with the width set at zero. The vertical table cell interprets this as a request to flow the vertical table cell with the character flow distance (CFD) 33 equal to zero. With the CFD set at zero, a new vertical line is forced after each character. This creates a very wide table cell width 29, not the desired minimum acceptable table cell width. Therefore, the TCSM is unable to measure the necessary minimum and maximum acceptable table cell widths.

Further, without these determined minimum and maximum acceptable widths for each individual cell within a column 19, 29, the TSM will be unable to propose a width for that column 43.

However, the existing methodology fails for at least one more reason. Even if the TSM could propose a width P 43, without knowing the minimum 29 and maximum 19 acceptable table cell widths, the TCSM could not use the proposed P anyway. P does not tell the TCSM how far to flow characters in the character flow direction. The TSM needs to know a CFD 42 in order to know how far to flow the characters in the table cell, and the proposed P 43 does not provide the needed CFD measurement 42. This was not a problem with horizontal table cells because as shown in FIG. 1, the TCSM was designed to use the proposed P 171 to determine how far characters should flow horizontally.

The invention offers a way to auto-size vertical table cells. The illustrated embodiment of the invention solves these problems and is able to auto-size table cell elements with the vertical character flow property. Further, the illustrated embodiment auto-sizes tables that contain table cells with both the vertical and the horizontal character flow property. The embodiment of the invention illustrated herein is called the vertical oriented method (VOM).

The VOM achieves the layout of HTML elements with the vertical character flow property. The VOM addresses this problem with a switch in logical perspective. The target element with the vertical character flow property is logically viewed at an angle rotated 90° clockwise. As shown in FIG. 2, physical width (W) 201 becomes logical height (LH) 252, and physical height (H) 202 becomes logical width (LW) 251.

The auto-sizing of HTML elements according to the VOM, produces either left-to-right HTML rectangle area layouts, or top-to-bottom layouts using a shared table sizing routine.

Additional features and advantages of the invention will be made apparent from the following detailed description of the VOM which proceeds with reference to the accompanying drawings.

BRIEF DESCRIPTION OF THE DRAWINGS

FIG. 1 is a graphical representation of a prior art horizontal character flow table cell element being measured for minimum and maximum cell width.

DETAILED DESCRIPTION

The illustrated embodiment is directed towards an HTML layout feature, which auto-sizes HTML tables and other HTML elements that have vertical character flow. For convenience purposes, the illustrated embodiment of the invention is labeled the vertical oriented method (VOM). Before describing the VOM, this document further discusses the existing table sizing method.

Horizontal Character Flow

Figure 1A:
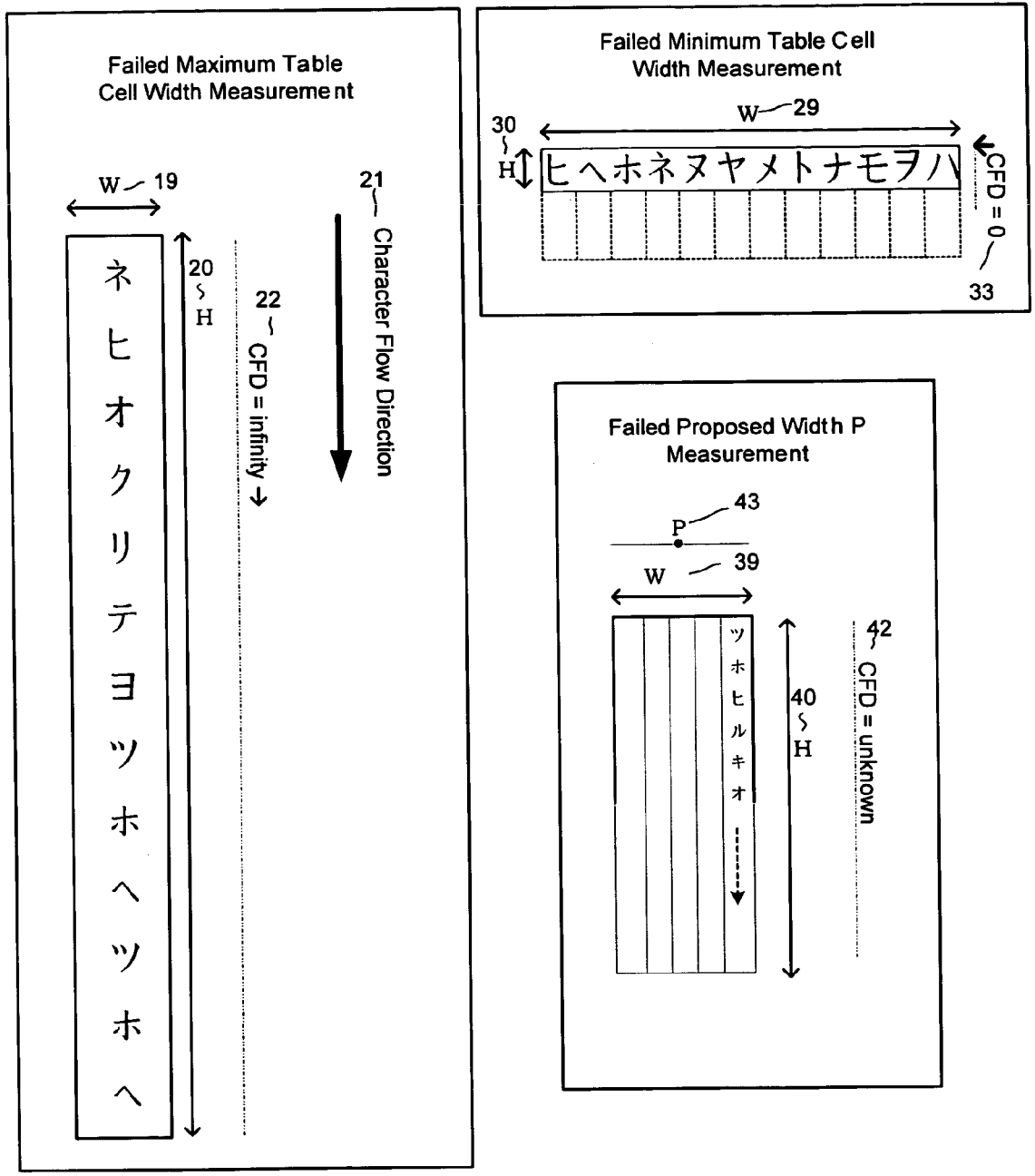
FIG. 1a is a graphical representation of why the existing cell sizing methodology would fail to auto-size if it were given a vertical table cell.

In FIG. 1, the existing table sizing method (TSM) was designed to layout a table containing rows and columns of table cells, where each table cell 104 contains characters that flow horizontally 103. The TSM determines the number of table cells per column and per row that need to fit within the table. The TSM uses this information to propose a width for each column.

However, before a width for each column can be proposed, the TSM needs to know the minimum 101 and maximum 151 acceptable width possible for each cell within a column. A Browser needs to be prepared to accept a wide variety of elements within a table cell—such as characters, images, and etc. If a given item is designed to be presented in entirety without being broken apart (i.e., an image), or without being forced onto separate lines (i.e., single syllable words), the largest of such unbreakable items is the largest non-breakable unit within the table cell or given area 102. This is important because the width of the column should not be less than the largest non-breakable unit within any cell in the column.

As shown in FIG. 1, the minimum acceptable width of a cell 101, is equal to the width of the largest non-breakable object within the cell 102. Whereas, the maximum acceptable width for a cell is simply the width of the cell 151 when each paragraph within the table cell is laid out horizontally on a single line 152. As shown in FIG. 1, the table cell labeled "Maximum Cell Width Measurement" has only one sentence 152. If the table cell had two or more paragraphs, each paragraph would appear within the table cell 152, with the second paragraph directly below the first, and all within the same cell box 152. In that case, the maximum acceptable table cell width would be whichever paragraph is widest 151.

The TSM determines the minimum 101 and maximum 151 acceptable table cell width by calling the table cell sizing method (TCSM). The TSM manages the entire table, whereas the TCSM simply sizes individual cells within the table.

The TSM calls the TCSM each time it needs to auto-size the table. The TSM heeds to auto-size the table (i) on initial table layout, (ii) on subsequent window size adjustments, (iii) on changes in the properties of the Object Model (OM), (iv) on editing actions, and (v) on other occasions.

The TSM requests a minimum and maximum acceptable width for each table cell from a table cell sizing method (TCSM). The TCSM determines the maximum acceptable cell width by flowing the text and graphical content into the table cell with the width set at infinity 151. The width is used by the TCSM to determine how far to let characters flow before forcing the next horizontal line. With the character flow distance set at infinity, each paragraph in the cell is flowed into a separate horizontal line 152. Accordingly, the table cell maximum acceptable width is generally defined as the width 151 of the longest paragraph when each word of that paragraph is placed in one horizontal line 152.

The TCSM next determines the minimum acceptable cell width by flowing the characters into a cell with the width set at zero 100. At zero width, each word in the cell content is forced onto a separate horizontal line 104. This creates a horizontal line for each word in the cell content. The table cell minimum acceptable width is generally defined as the width of the longest word 102.

Based on these determined minimum 101 and maximum 151 acceptable widths for each individual cell within the table, the TSM will be able to propose a width for each column within the table. The TSM then asks the TCSM to render each table cell within a column at the proposed width (P) 171. The TCSM flows the content into the table cell at the proposed width P 171. The TCSM then measures the resulting height (H) 181 and width (W) 180 of the table cell. The TSM then lays out the table based on the measured dimensions of the cells in each column.

In more detail, the TSM steps are as follows:
1. Calculate the minimum and maximum cell width for each cell in the table.
   a. Minimum Cell Width: This determination is made by TSM with a call to TCSM(W=0). When W is set to zero, this forces the TCSM to place the smallest non-breakable object on each horizontal line (in this case a word). The minimum width 101 for which this table cell can be rendered, is equal to the width of the word "Where" 102. Therefore, the TCSM returns to the TSM the minimum width set equal to the width of "Where" in pixels.

TCSM(W=0)->(W=actual, H=actual)

b. Maximum Cell Width: This determination is made by TSM with a call to TCSM(W=infinity). When width is set to infinity, this allows the TCSM to place each paragraph within the cell onto one line 152. The horizontal length of the longest paragraph in the cell is the maximum width. This represents the maximum possible width 151 that this table cell could possibly need in order to render its content element. Therefore, the TCSM returns to the TSM, the maximum cell width 151 set equal to the width of "Where did the crow fly?" 152 in pixels.

TCSM(W=infinity)->(W=actual, H=actual)

2. Calculate each columns' width based on the minimum and maximum sizes of each cell within the column. Set a proposed width for each column (P).
3. Measure the height of each cell 181, at the proposed width P 171, for each cell within each column.
   a. Measure Cell Height: This determination is made by TSM with a call to TCSM(W=P). When W is set to P, this instructs the TCSM to fill each successive table cell horizontal line until width P is reached 171, and then to place the overflow onto the next horizontal line. The TCSM then returns the actual height 181 and the actual width measurements of the cell in pixel units.

TCSM(W=P)->(W=actual, H=actual)

4. The TSM then renders the table on the display.

Now that the pre-invention relationship between the TSM and the TCSM has been defined, it will be easier to understand the VOM.

Vertical Oriented Method (VOM)

The VOM allows the pre-existing TSM-TCSM to continue to layout horizontally oriented table cells in a table, but also to layout one or more vertically oriented cells within the same table. Additionally, the VOM allows the TSM-TCSM to layout a table that consists entirely of vertically oriented table cells. Further, the VOM is not limited to HTML tables, but can be used to implement the vertical character flow property in other non-table cell HTML child elements such as DIV and SPAN within other parent elements such as BODY.

The Logical Perspective of the VOM

Figure 2:
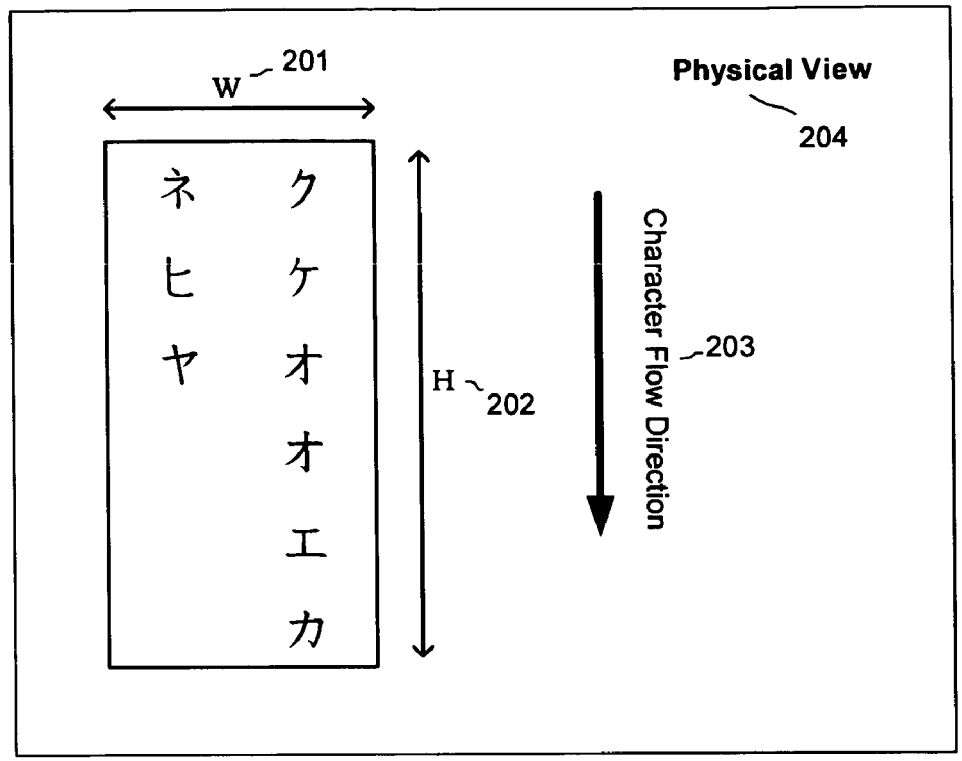
FIG. 2, according to the illustrated embodiment of the invention, is a block diagram distinguishing between the physical and logical views.
Figure 2:
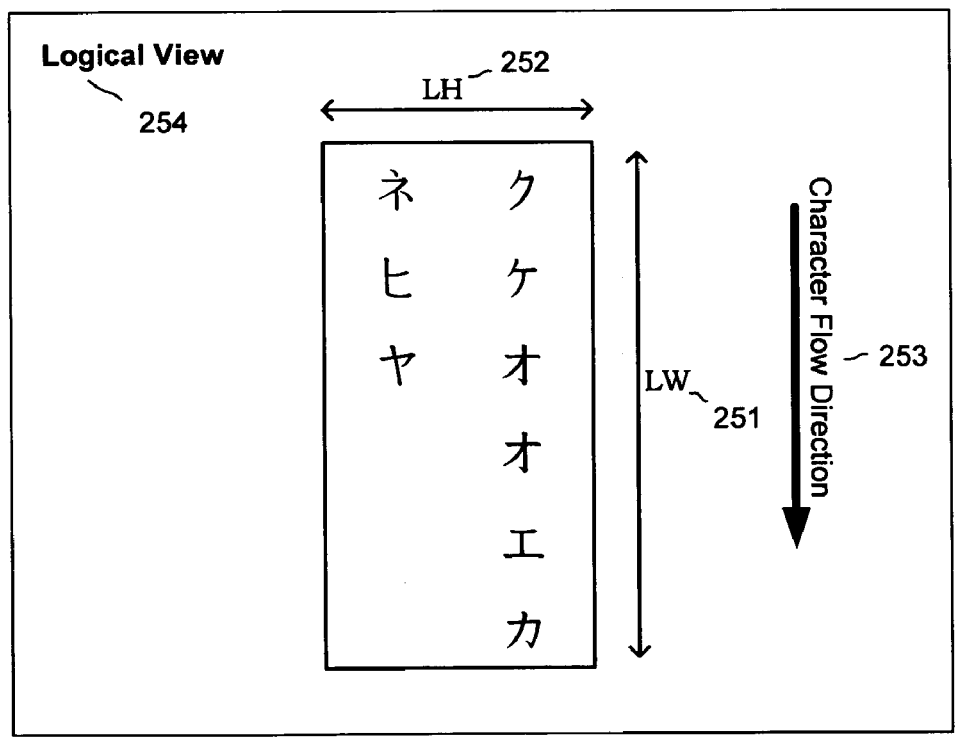

A seen in FIG. 2, the VOM implements a logical view of the dimensions. Logical width (LW) 251 is defined as the direction of character flow 253, and logical height (LH) 252 is defined as perpendicular to LW. So the VOM maintains a logical view that is rotated by 90 degrees clockwise from the TSM coordinate system. In the VOM world, W becomes LH, and H becomes LW.

However, neither the TSM nor the TCSM is aware of this logical transformation. Rather through the VOM, the TSM obtains a width (W) 201 and height (H) 202 for each cell in the table, and uses this information to render the table. From the TSM and TCSM perspective even after the invention, W 201 remains horizontal, and H 202 remains vertical.

The TSM was designed to directly call the TCSM to determine minimum 101 and maximum 151 acceptable table cell width. Next, the TSM was designed to directly call the TCSM with a proposed width P 171 in the horizontal character flow direction, and return the height of the cell in the vertical direction 181. Since in vertical cells, the character flow direction is vertical 203, the TCSM appears to be inadequate for the task at hand.

Figure 3:
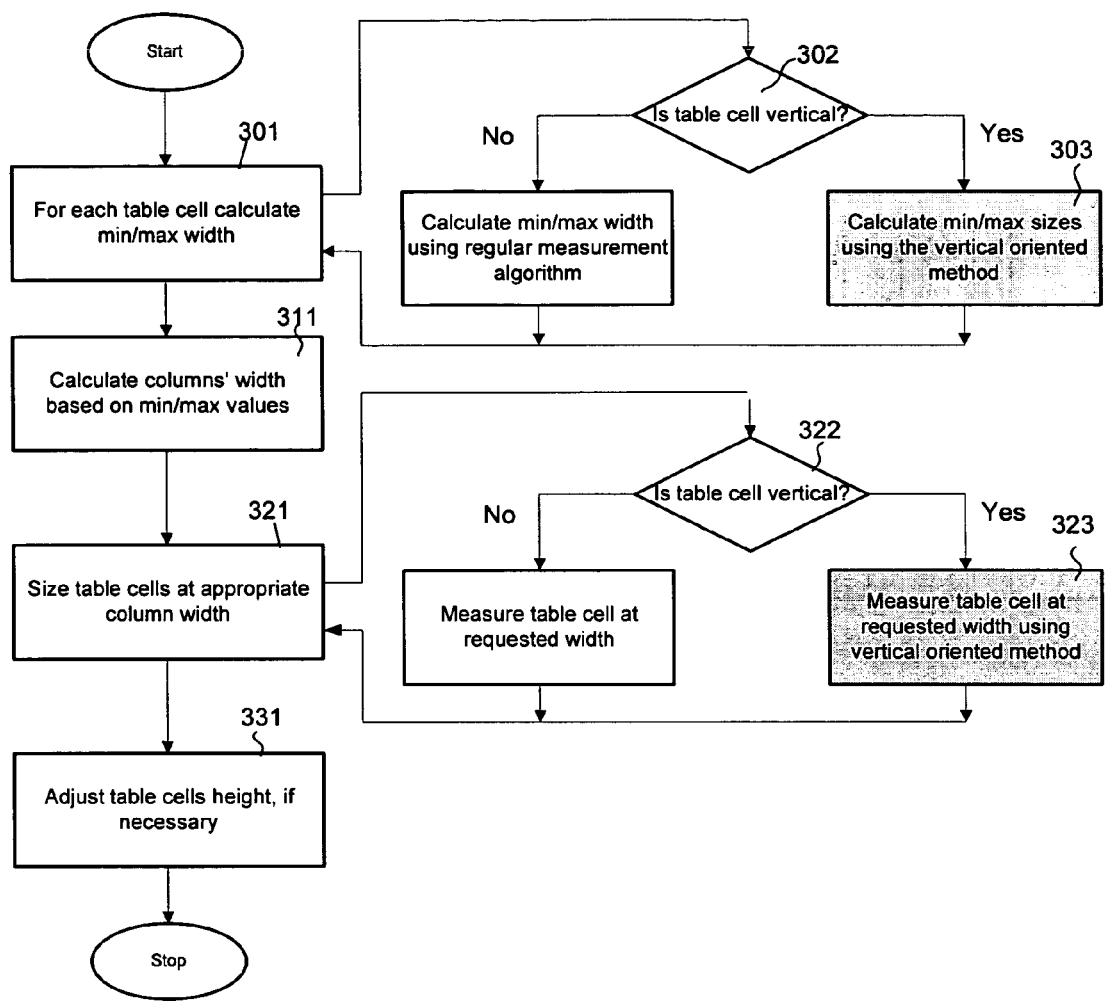
FIG. 3 is a flow chart depicting flow process in the table sizing method.

To overcome this problem, when a table cell has the vertical character flow property, the VOM is responsible for proper communications between the TSM and TCSM. Above under the heading "Horizontal Character Flow" four TSM Steps were discussed. These four Steps continue to exist as represented in FIG. 3, (Step 1=301, Step 2=311, Step 3=321, Step 4=331), however, when the table cell element has the vertical character flow property, the VOM manages communications between the TSM and TCSM to obtain the desired results.

Figure 4:
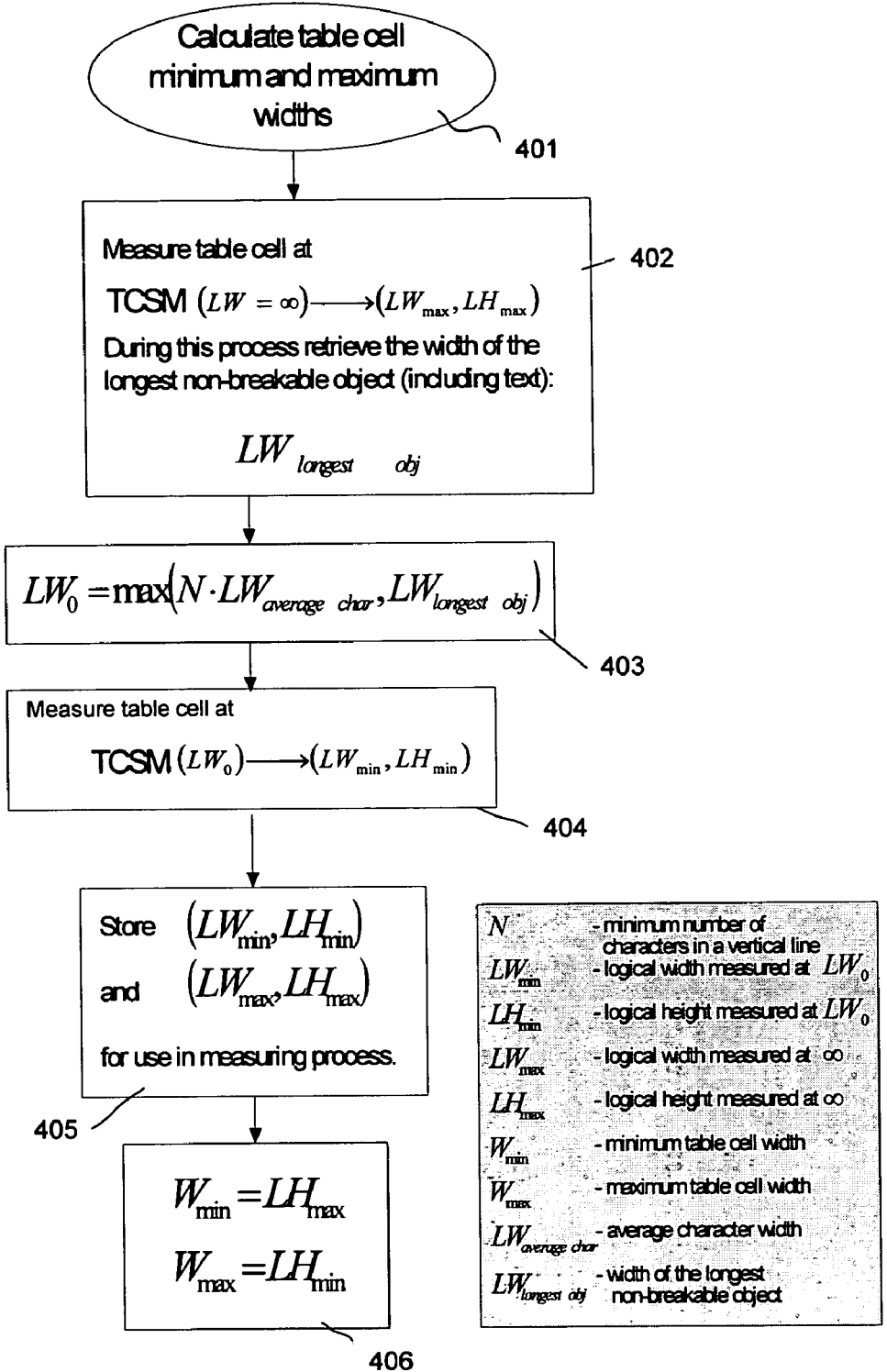
FIG. 4 is a flow chart depicting vertical oriented method implementation of minimum and maximum cell width dimensions.
Figure 5:
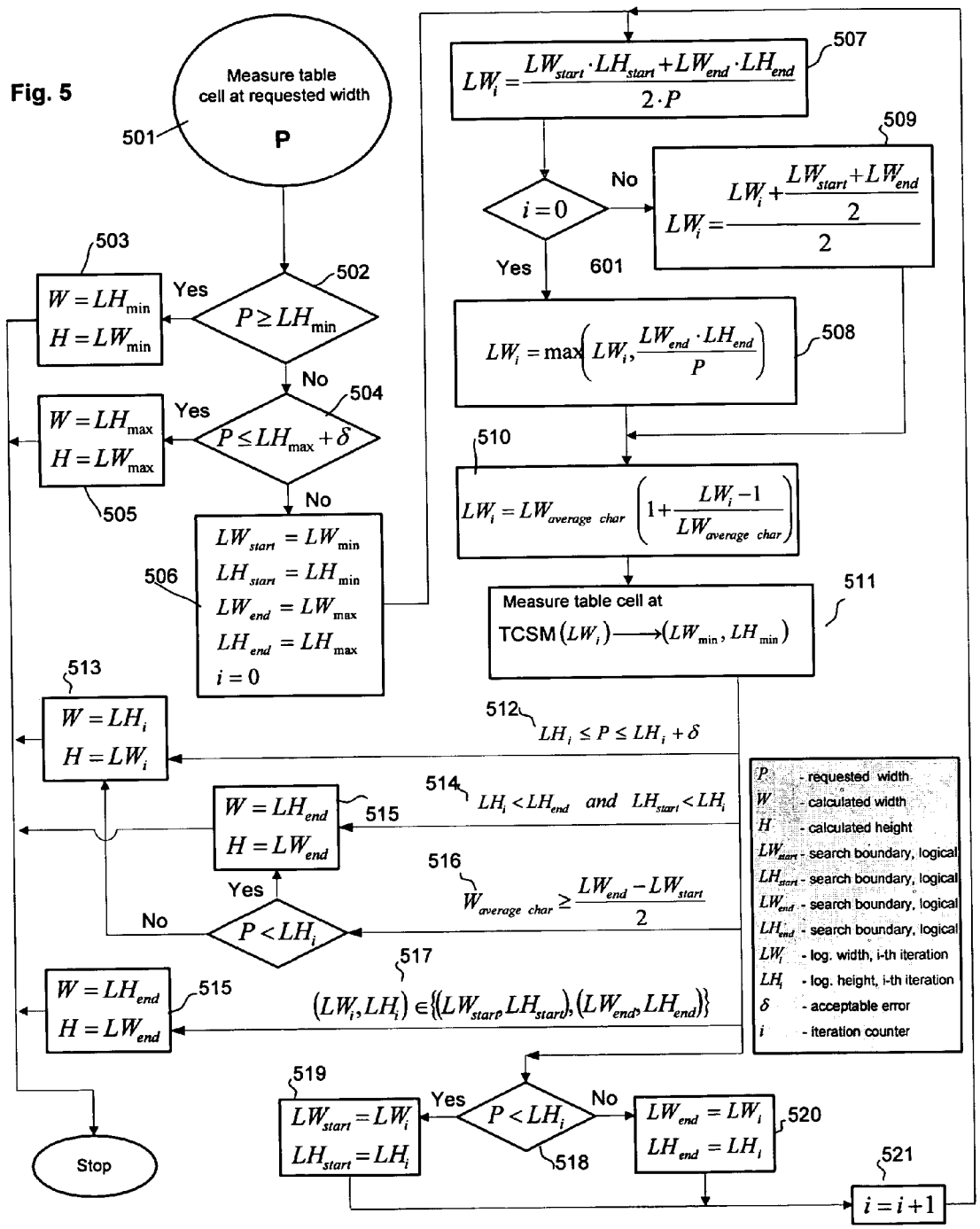
FIG. 5 is a flow chart depicting the vertical oriented method for measurement of table cell at proposed width.

In the case of a table cell element with the vertical character flow property, the VOM is implemented 302–303, as defined in FIG. 4, and the VOM is implemented 322–323, as defined in FIG. 5. These VOM implementations will be discussed in detail, but first lets examine the VOM's logical view of a vertical table cell.

TSM-TCSM and The VOM implementation at Steps 1 and 3

The VOM implementation has the additional benefit that it fits within the existing TSM-TCSM architecture created for horizontal text flow. This specification will discuss how the VOM manages the communications between the TSM and TCSM to bring about a method for measurement of a table cells with vertically oriented character flow.

As previously discussed, and as shown in FIG. 3, the four general steps involved in the existing TSM-TCSM relationship continue. However, during Steps 1 301–303, and Step 3 321–323, if a table cell is vertical, the VOM manages the communications between the TSM and TCSM as follows:

Altered Step 1:

When TSM asks the TCSM to calculate the minimum and maximum cell width for each cell in the table, the VOM checks to see whether the given table cell element has the vertical character flow property 302.

If the given table cell has the horizontal character flow property, then the TCSM can compute the minimum and maximum cell width as discussed above under Horizontal Character Flow.

Figure 6:
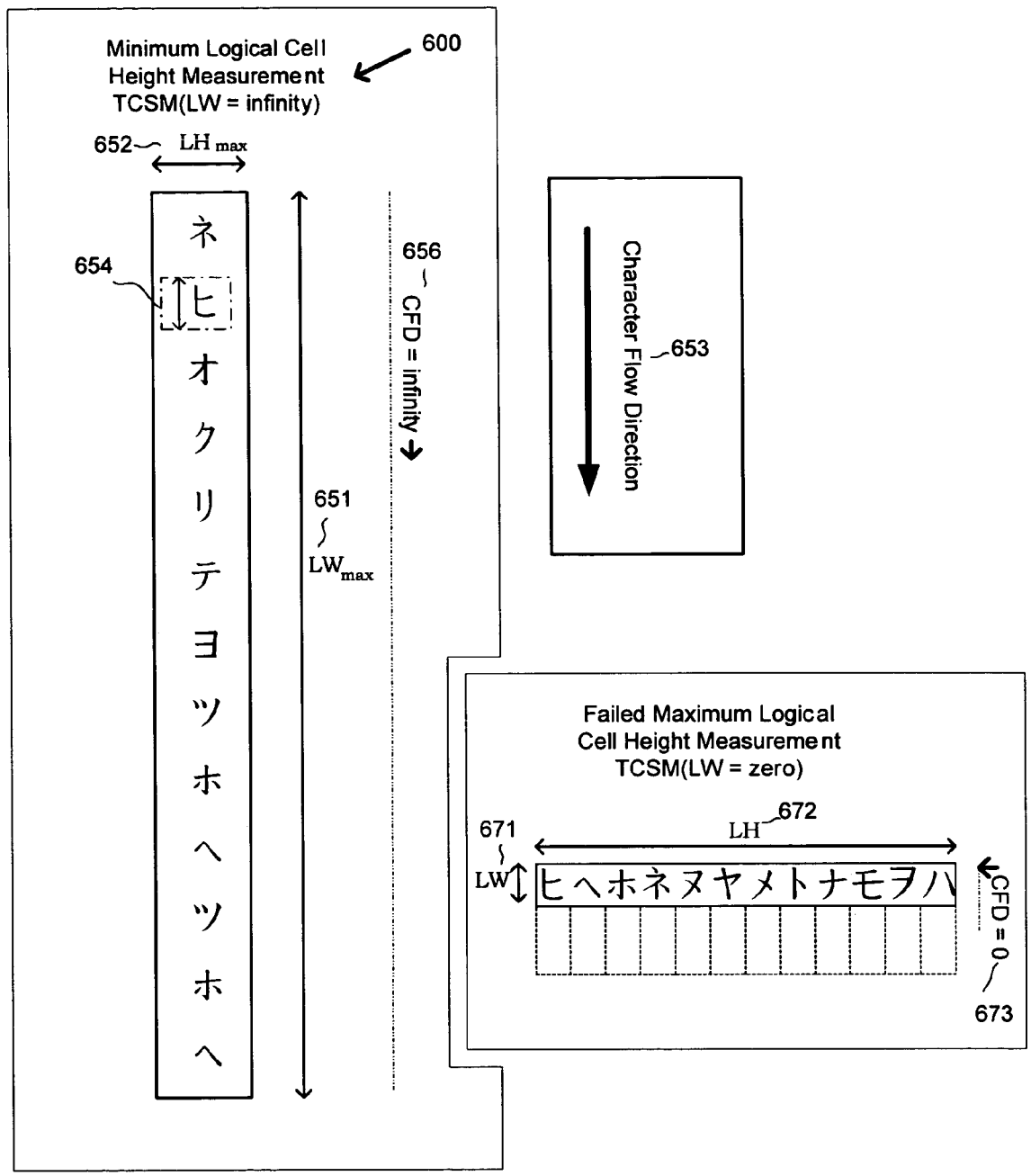
FIG. 6 is a graphical representation of the logical view of a typical vertically oriented table cell being measured for minimum table cell logical height.

If the given table cell has the vertical character flow property 302, then the VOM measurement is implemented 303, as shown in FIG. 4. The VOM determines the minimum and maximum width as follows:

a. Minimum Cell Width: When the TSM requests minimum acceptable cell width, that request is turned into a request for minimum LH by the VOM. As seen in FIG. 6, the minimum LH 652 can be obtained by setting the character flow distance (CFD) equal to infinity 656. This forces all characters within each paragraph of the cell contents to flow into one single vertical line. In the case of vertical table cells, character flow distance (CFD) has the same meaning as LW. As shown in FIG. 4, the VOM calls the TCSM($LW_i=\infty$) 402, and the TCSM returns ($LW_{max}$, $LH_{max}$) and $LW_{longest\ obj}$ 654 to the VOM. The subscript "max" on LW and LH, signifies that all characters in each paragraph of the cell were forced into one vertical line because the character flow distance (LW) was set to infinity 656. Since all paragraphs are on one vertical line the resulting LH 652, measurement is actually a minimum. So the VOM returns ($LH_{max}$) to the TSM as the minimum acceptable cell width measurement for that table cell. The output $LW_{longest\ obj}$ 654, is the measurement of the longest object (character or other element) in the cell, when the measurement of each such object is taken in the character flow direction 653. Notice that the VOM has changed the input to the TCSM as follows:

Horizontal Minimum Acceptable Table Cell Input:

TCSM(W=0)

Vertical Minimum Acceptable Table Cell Input:

TCSM(LW=infinity).

Although neither the TCSM nor the TSM are aware of this VOM implementation, the TSM now has the proper minimum acceptable table cell width measurement.

b. Maximum Cell Width: When the TSM requests maximum acceptable cell width, that request is turned into a request for maximum LH by the VOM. As seen in FIG. 6, the maximum LH 672 could be obtained by setting the character flow distance (LW) equal to zero 673. By setting the character flow distance LW equal to zero, a single character is forced onto each vertical line, creating the greatest possible LH 672. However, this is not acceptable because readers are expecting to read vertically down the column and this reads from right to left. This would be the equivalent of one word per horizontal line in horizontal languages. This is a failed attempt at setting the maximum acceptable table cell width 672. In FIG. 4, the VOM solves this problem by introducing an equation that forces a minimum number of characters per vertical line 403 in order to meet the expectations of readers of a given language. For example, Japanese typography is measured at a character flow distance of $LW_0$, where $LW_0$=maximum of $LW_{longest\ obj}$ and $N \cdot LW_{average\ char}$ 403. Note that $LW_{average\ char}$ is the average width of all characters in the current writing script. It is helpful to keep an already determined $LW_{average\ char}$ for each vertical language character set in a table for quick access. Further, N is a constant which should be empirically determined based on the expectations of readers in each vertical language. In Japanese, N=10, since it was empirically determined to be within a Kanji readers minimum vertical line height expectations. Further, a table cell may contain other objects with a greater LW than $N \cdot LW_{average\ char}$. In such cases, the max() function 403 assures that such greater $LW_{longest\ obj}$ will become the $LW_0$. So the VOM first determines the character flow distance $LW_0$ 753, and then calls TCSM($LW_0$) 754. The output of this process is ($LW_{min}$, $LH_{min}$) 752–753. The VOM returns $LH_{min}$ to the TSM as the maximum cell width measurement. Characters are flowed into a vertical line until the vertical length $LW_0$ 754 is reached. Each time the character flow reaches $LW_0$, a new vertical line starts, and the characters begin to flow into the new vertical line. In this case, since N=10, the table cell receives about 10 characters per vertical line 753. In a given table cell of X Kanji characters, the resulting table cell is created with height of approximately N characters, and a physical width of approximately X/N characters. By holding the character flow distance at $LW_0$, it creates a maximum LH 752 that is labeled ($LH_{min}$) 752. Again, the subscript "min" on LH, refers to the minimum LW of $LW_0$, which in turn creates a maximum LH measurement. Notice that the VOM has changed the input to the TCSM as follows:

Horizontal Maximum Acceptable Table Cell Input:

TCSM(W=infinity)

Vertical Maximum Acceptable Table Cell Input:

TCSM(max($LW_{longest\ obj}$, $N \cdot LW_{average\ char}$)).

Although neither the TCSM nor the TSM are aware of this VOM implementation, the TSM now has the proper maximum acceptable table cell width measurement.

Calculated sizes ($LW_{min}$, $LH_{min}$) and ($LW_{max}$, $LH_{max}$) are stored by the VOM 405, to be used later in Step 3—VOM Implementation, and ($LH_{min}$) is returned to TSM as a maximum acceptable cell width 406, and ($LH_{max}$) is returned to TSM as a minimum acceptable cell width 406.

Step 2 (Unaltered).

The TSM determines a proposed width for each column in the table based on the minimum and maximum table cells widths collected in Step 1.

Step 3—VOM Implementation:

As shown in FIG. 3, in case of table cell with the vertical character flow property 322, the VOM is implemented 323. In this Step, the TSM needs to find out the height of each cell within the column at the proposed width P. So, the TSM calls the TCSM to measure the height of each cell within the column at the proposed P.

Figure 7:
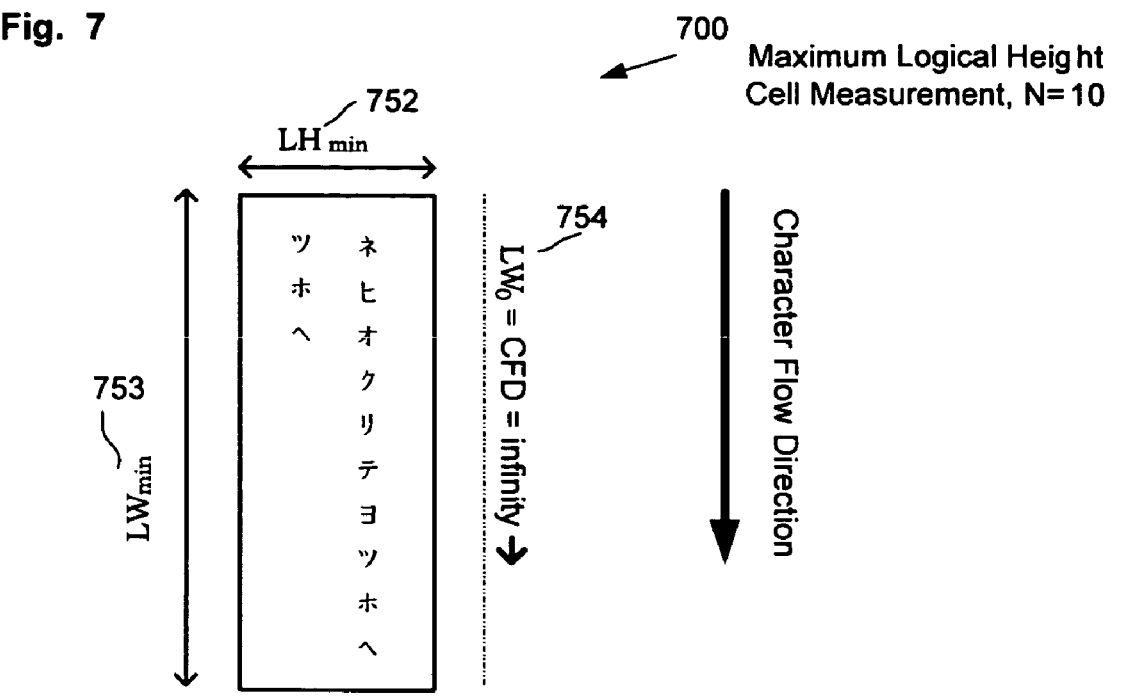
FIG. 7 is a graphical representation of a vertical character flow table cell being measured for maximum logical height, and for a arbitrary proposed width P.
Figure 7:
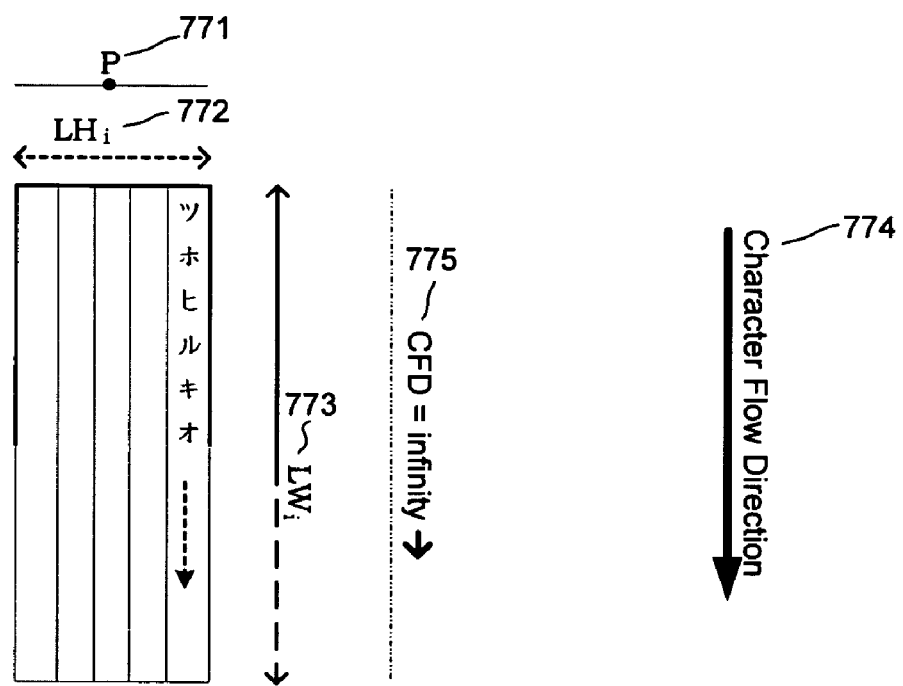

In FIG. 7, the TCSM can only measure the cell logical height 772 and logical width 773 dimensions, after it has been told how far to let characters flow in the character flow direction (CFD) 775, before forcing a new vertical line. The desired P 771 offered by the TSM does not tell the TCSM how far to let characters flow vertically 775, rather P represents the LH direction 772. Since the table cell is vertical in this case, the proposed width P 771 is perpendicular to the character distance $LW_i$ 773.

So VOM solves this problem by estimating a character flow distance $LW_i$ 773, that is most likely to result in $LH_i$ 772, that is close to the P 771 requested by the TSM.

Once the VOM has estimated the character flow distance $LW_i$ 773, the VOM calls TCSM($LW_i$). The TCSM flows the characters into the table cell at the character flow distance of $LW_i$, and then returns the resulting table cell dimensions to VOM. The VOM checks to see if the resulting width $LH_i$ 772 measurement is close enough to the requested P 771. If so, the resulting cell dimensions, $LH_i$ 772 and $LW_i$ 773, are returned to TSM as they will be rendered in the actual table view—(W=$LH_i$, H=$LW_i$) 775–776.

FIG. 5, and the following steps define how the initial $LW_i$ 773 estimate is determined (i=0), and how subsequent $LW_i$ estimates are determined (i=1, 2, . . .) until the resulting $LH_i$ 772 measurement for a corresponding $LW_i$ is within an acceptable range of the P 771 requested by the TSM.

Finally, before looking at the following steps, the relationship between LH and LW is considered. A table cell is rectangular in shape and the final dimensions must be capable of holding all characters (or other objects) defined for that cell. If one side of the rectangle is decreased, the other side of the rectangle will generally increase in order to hold the contents. So if LW is increased, LH will generally decrease, or if LW is decreased, LH will generally increase. LW and LH have an inverse relationship.

Further, when the cell has the vertical character flow property, the LW has the additional general restriction that each vertical sentence in the cell will have approximately N characters (as defined above in Step 1—VOM Implementation).

Figure 8:
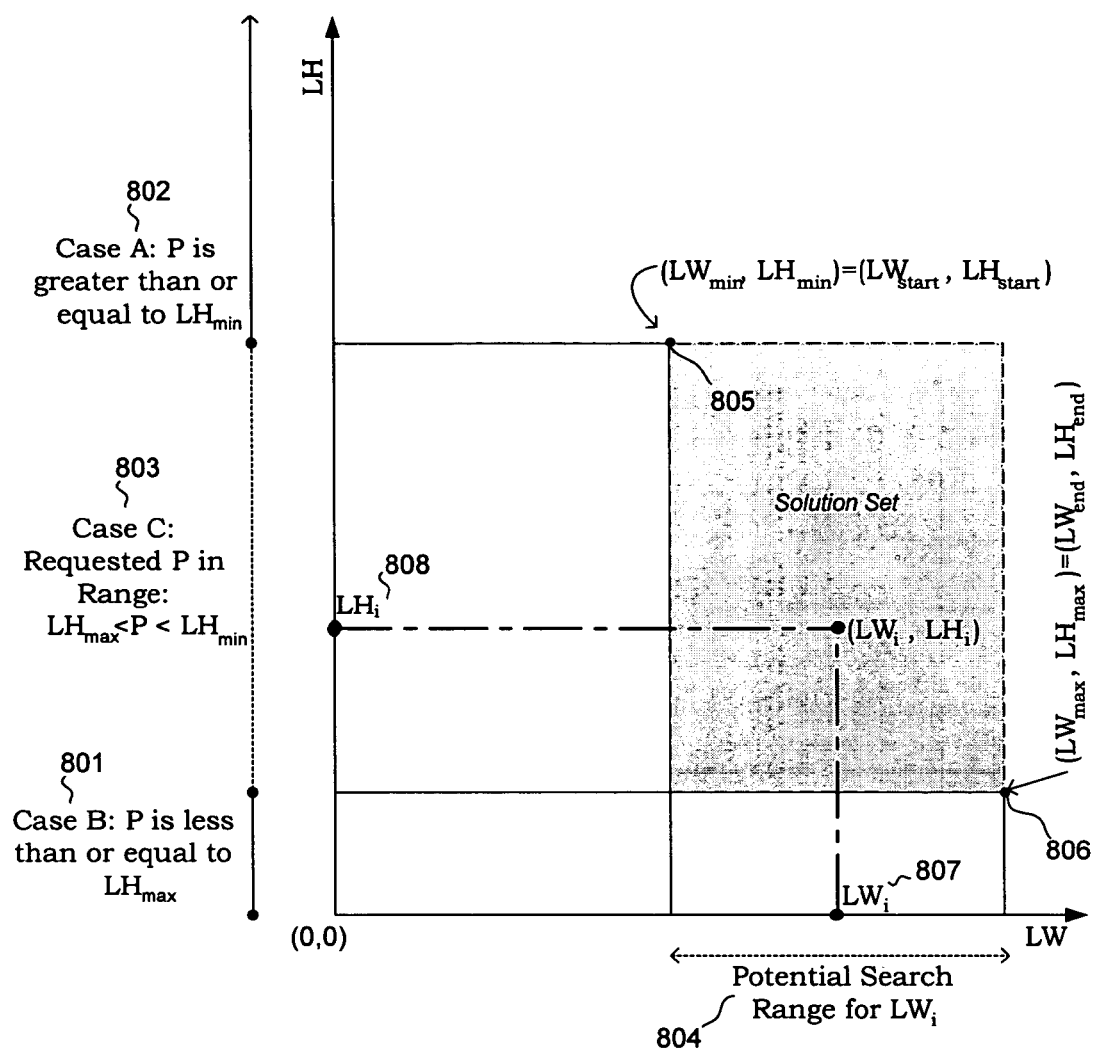
FIG. 8 is a graph that depicts the minimum and maximum width vertical table cells, and the potential solution set for some arbitrary table cell dimensions ($LW_i$, $LH_i$) with logical height near the requested P value.

FIG. 5 presents the VOM implementation for cells with the vertical character flow property. The basic premise of Step 3—VOM Implementation is that the VOM receives a requested P from the TSM, and the TSM expects to receive in return the height and width of the rendered cell. However, the TCSM can not use P 771 as input since P is not in the character flow direction 774, so the following steps must find acceptable dimensions another way. The VOM accepts the requested P and performs the following steps until acceptable cell dimensions are estimated:

A. Case $P \geq LH_{min}$: In FIG. 8 and FIG. 5, if the TSM requests $P \geq LH_{min}$ 502, 802, then the VOM returns the dimensions $(W=LH_{min}, H=LW_{min})$ 503, 805. In that case, $LH_{min}$ 752 is most likely the largest logical height to be reached by the cell because it was determined when LW was set at a minimum 753. So if the TSM requests P 501 such that $P \geq LH_{min}$, 502, simply return the rectangle dimensions already calculated in Step 1(b) 503. There is no need to estimate an initial $LW_i$. Since TSM is requesting a P that is greater than necessary to hold the cell contents even when LW is set at its minimum 805, no further calculation need be done. We simply return the rectangle area measured 700 in Step 1(b)—VOM Implementation in the coordinate system expected by TSM—$(W=LH_{min}, H=LW_{min})$ 503, 805.

B. Case $P \leq LH_{max}+\delta$: In FIG. 8 and FIG. 5, if the TSM requests $P \leq LH_{max}+\delta$ 801, 504, then the VOM returns $(W=LH_{max}, H=LW_{max})$ 806, 505. In that case, $LH_{max}$ is most likely is the smallest LH 652 to be reached by the cell since it occurs when all characters are placed on one vertical line 651. So if $P \leq LH_{max}+\delta$, simply return the table cell dimensions 600 already calculated in Step 1(a)—VOM Implementation. $\delta$ is an acceptable error, which can introduce some blank space during rendering, but noticeably increases performance and at the same time will not introduce any content clipping. $\delta$ may range from 10–30% of P, but is presently set at 30% of P at this time in the calculation. Simply return the rectangle area measured in Step 1(a)—VOM Implementation in the coordinate system expected by TSM—$(W=LH_{max}, H=LW_{max})$ 806, 505.

C. In FIG. 8, if neither case A 802 nor case B 801 is true, then the minimum and maximum table width sizes determined for this cell in Step 1—VOM Implementation, cannot be used directly for the requested P 771. So the VOM must then estimate an $LW_i$ 773, 807 that will likely result in a $LH_i$ 772, 808 that is within an acceptable range of the requested P 771, 803. From case A and B, we already know that requested P is greater than $LH_{max}+\delta$ 801, 505, but less than and $LH_{min}$ 802, 502. Therefore, as depicted in FIG. 8, the initial search boundaries 803 804 for an acceptable rectangle to hold the cell contents is set as: $(LW_{start}, LH_{start})=(LW_{min}, LH_{min})$ 805 and $(LW_{end}, LH_{end})=(LW_{max}, LH_{max})$ 806. The goal then is to guess an $LW_i$ 807, 773 between $(LW_{start})$ and $(LW_{end})$ that upon a call to $TCSM(LW_i)$, will return an output $(LW_i, LH_i)$, such that $LH_i$ 808, 772 is within an acceptable error of the proposed width P 771.

D. In FIG. 5, using an averaging formula, an initial proposed logical width $LW_i$ 507 is set that is likely to result in an $LH_i$ near the proposed width $$LW_i = \frac{LW_{start} \cdot LH_{start} + LW_{end} \cdot LH_{end}}{2 \cdot P}.$$

This formula assumes that each non-breakable unit inside the table cell is the same size and is square. This is true for the common case in Asian Typography, where each character is a "word" and the glyph for that character is typically square. Note that if the content is not of this nature, then this first approximation will fail and we will have to estimate a new $LW_i$ in subsequent iterations. However, in most cases, based on the square characteristics of Asian Typography, this $LW_i$ estimate woks and the search for an $LW_i$ that results in a $LH_i$ that is within an acceptable range of the requested P is successful. However, the following steps make a few adjustments to the resulting $LW_i$, before the call to $TCSM(LW_i)$.

E. For better performance during the first iteration i=0 508, we make two adjustments that increase the probability that $P > LH_i$.
  1. $LW_i$ is adjusted such that $$LW_i = \max\left(LW_i, \frac{LW_{end} \cdot LH_{end}}{P}\right).$$

If the cell contains more than one paragraph or it contains irregular chunks of text, $$\frac{LW_{end} \cdot LH_{end}}{P}$$

can give a better approximation of the requested size.
  2. The acceptable errors $\delta$ is increased only for this pass so as to increase the probability of success. $\delta$ is set at 30% of P for i=0, and for 10% of P for i=1,2,3, . . . .

F. For better performance during all subsequent iterations ($i \neq 0$) 509, set $$LW_i = \frac{LW_i + \frac{LW_{start} + LW_{end}}{2}}{2}.$$

This will increase the probability that $P > LH_i$.

G. In every case, where the element content contains characters only (majority of cases), increase $LW_i$ 510 as follows:

$$LW_i = LW_{average\ char} \cdot \left(1 + \frac{LW_i - 1}{LW_{average\ char}}\right).$$

H. Now, run $TCSM(LW_i)$ 511 to obtain the height and width dimensions of the cell at the resulting proposed logical width $LW_i$. The output of this process is $(LW_i, LH_i)$.

I. If the calculated logical height $LH_i$ 512 is within the acceptable error of P as follows: $LH_i \leq P \leq (LH_i+\delta)$, then return $(W=LH_i, H=LW_i)$ 513 as the cell dimensions to the TSM.

J. If calculated logical height is outside the searching boundary as follows:, ($LH_i > LH_{start}$ and $LH_i < LH_{end}$) 514, then return the best solution so far ($W=LH_{end}$, $H=LW_{end}$) 515 to the TSM. This exit condition can be satisfied in case of content having objects with extreme size differences and is treated as an error escape from the searching algorithm.

K. If searching range is too small $$LW_{average\ char} \geq \frac{LW_{end} - LW_{start}}{2} 516,$$

return the best solution so far. This condition guarantees a finite searching process. If $P < LH_i$ return ($W=LH_{end}$, $H=LW_{end}$) 515 to the TSM, otherwise return ($W=LH_i$, $H=LW_i$) 513 to the TSM.

L. If during the i-th step, there is no progress ($LW_i$, $LH_i$)∈{($LW_{start}$, $LH_{start}$), ($LW_{end}$, $LH_{end}$)} 517, return the best solution so far ($W=LH_{end}$, $H=LW_{end}$) 515 to the TSM.

M. At this point an acceptable solution hasn't been found and none of the stop conditions has been satisfied. So the search boundary needs to be reduced before repeating the search steps. If $P < LH_i$ 518, then change the start condition ($LW_{start}$, $LH_{start}$)=($LW_i$, $LH_i$) 519, otherwise change the end condition ($LW_{end}$, $LH_{end}$)=($LW_i$, $LH_i$) 520.

N. Increment iteration counter i 521 and go to Step 3—VOM Implementation, paragraph D 507, to estimate a new $LH_i$ and continue the search process.

Step 4 (Unaltered). The VOM implements no actions in the TSM Step 4.

This completes the discussion of the VOM adaptation to the existing TSM-TCSM table cell auto-sizing relationship. However, the VOM is adaptable to several other HTML contexts such as DIV, SPAN, BLOCKQUOTE, etc. Anytime a calling object or method needs to position a vertical character flow object within a given area, the VOM can be applied.

In such a case the calling object or method would perform the steps substantially as defined herein for the TSM, the called object or method would perform the steps substantially as defined herein for the TCSM, and the VOM adaptation would continue to perform substantially as herein described.

For example, given an HTML BODY element containing an HTML DIV element with the vertical character flow property, the VOM implementation could be used to determine the minimum and maximum DIV element widths, and then flow the DIV element contents at a proposed width P, requested by the BODY element.

Further, there would be empirically determined alterations to N based on (i) the given character set (or language) and (ii) the human expectations for that character set (or language) in the context the vertical character flow object is displayed.

Exemplary Operating Environment

Figure 9:
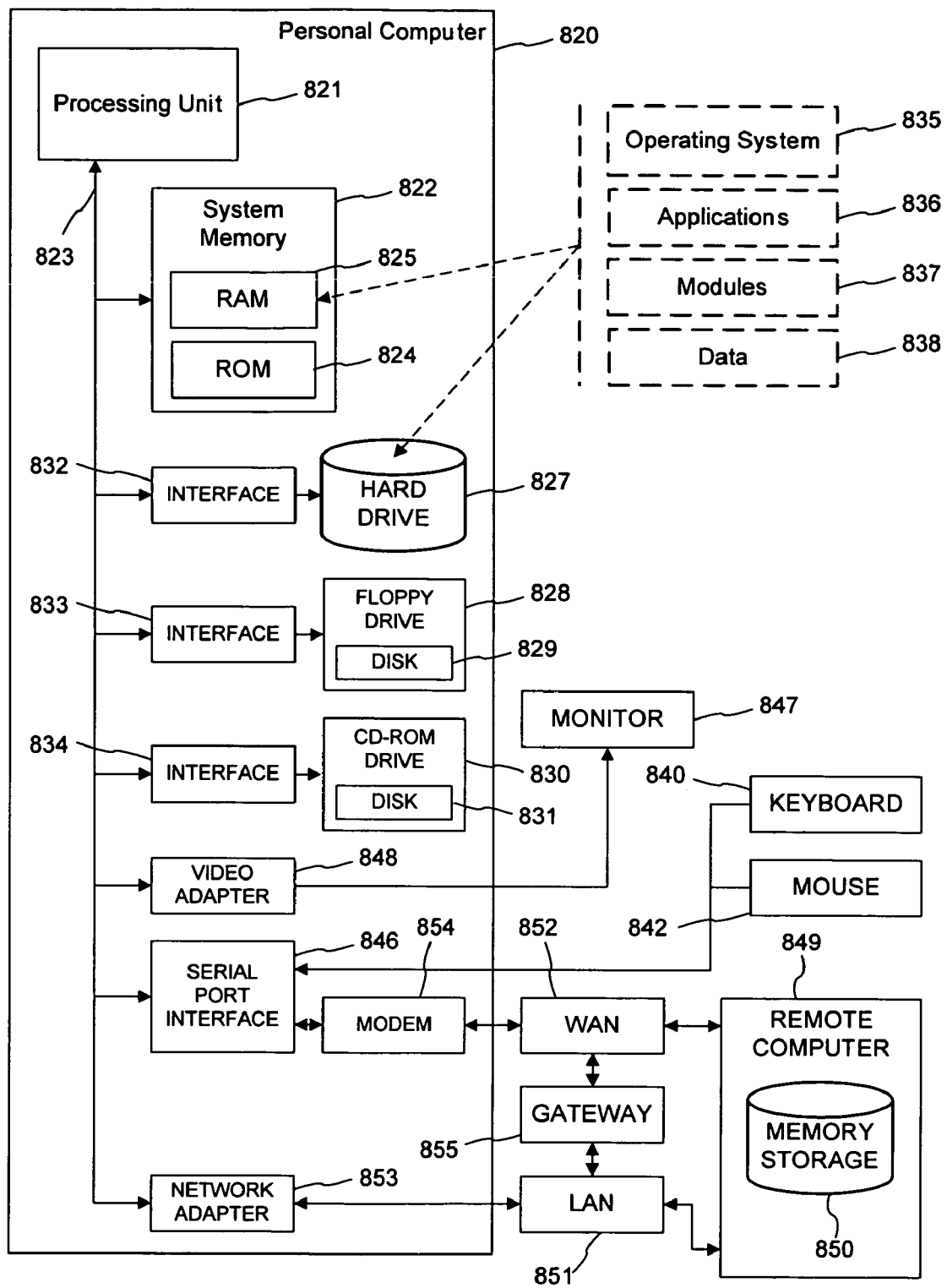
FIG. 9 is a block diagram of a distributed computer system that may be used to implement the detailed description.

FIG. 9 and the following discussion are intended to provide a brief, general description of a suitable computing environment in which the invention may be implemented. While the invention will be described in the general context of computer-executable instructions of a computer program that runs on a computer and/or computer printer, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including hand-held devices, multiprocessor systems, microprocessor-based or programmable consumer electronics, minicomputers, mainframe computers, and the like. The illustrated embodiments of the invention also can be practiced in networked computing environments, or on stand-alone computers.

Further, the illustrated embodiment of the invention may be practiced on all the following either alone or in a network environment (wireless or not): portable computing devices, electronic organizers, electronic day planners, electronic devices with screens, devices connected to screens, devices connected to printers, cell phones with miniature browsers, textual pagers, hand-held inventory devices, vehicles containing onboard devices with displays, or devices of any kind that render text or character for display or printing.

With reference to FIG. 9, an exemplary system for implementing the invention includes a conventional computer 820 (such as personal computers, laptops, palmtops or handheld-PCs, set-tops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838.

A user may enter commands and information into the computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of printer or computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Further, although illustrated as implemented in a computer printer, the invention can be practiced in other printing apparatus, such as copiers, fax machines, combined purpose printers, etc.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system with a textual mark-up language engine, a table sizing code segment designed to auto-size table elements, a table cell sizing code segment designed to auto-size table cell elements, an altering code segment performing a method comprising:

in the case determining that a table sizing code segment is causing a table cell sizing code segment to execute a code path determining a minimum width table cell measurement for a given table cell element with a horizontal character flow property, causing the table cell sizing code segment to execute a code path using a minimum width input designed for a table cell element with the horizontal character flow property; and in the case determining that a table sizing code segment is causing a table cell sizing code segment to execute a code path determining a minimum width table cell measurement for a given table cell element with a vertical character flow property, causing the table cell sizing code segment to execute using a maximum width input that is likely to cause element content to be flowed into a single vertical line.

2. The method of claim 1, where an output from the table cell sizing code segment consists of a logical height measurement and a logical width measurement, and the logical height measurement is returned to the table sizing code segment as an acceptable minimum width for the given table cell element.

3. The method of claim 2, wherein the table sizing code segment causes the table cell sizing code segment to size the given table cell element at a proposed width input of less than or equal to said logical height returned to the table sizing code segment as the acceptable minimum table cell width plus some minimal acceptable error, and an output of the table cell sizing code segment using the proposed width input comprises a new logical height and a new logical width measurements, which are returned to the table sizing code segment, the new logical height returned as physical width, and the new logical width returned as physical height.

4. The method of claim 3, wherein the minimal acceptable error ranges from ten to thirty percent of the proposed width.

5. The method of claim 1, where an output from the table cell sizing code segment is a measurement of a character or other object in the element content with a longest logical width measurement, the longest logical width measurement being determined by measuring each object or character in the vertical direction.

6. In a computer system with a textual mark-up language engine, a table sizing code segment designed to auto-size table elements, a table cell sizing code segment designed to auto-size table cell elements with a horizontal character flow property, an altering code segment for altering communications between the table sizing code segment and the table cell sizing code segment to render auto-sized textual mark-up language table cells with a vertical character flow property, the altering code segment performing a method comprising:

determining that a table sizing code segment is attempting to cause a table cell sizing code segment to execute a code path that determines an acceptable maximum width table cell measurement for a given table cell element using a maximum width input designed to be used by the table cell sizing code segment to measure a table cell element with the horizontal character flow property to render a maximum table cell horizontal width;

determining that the given table cell element has a vertical character flow property;

determining an average character logical width for a language contained in the given table cell element;

determining a maximum distance that characters will be allowed to flow in the vertical character flow direction, the maximum distance determination being made based on some empirically determined number N multiplied by the average character logical width; and causing the table cell sizing code segment to execute a code path using the determined maximum distance as input instead of the maximum width input 7. The method of claim 6, where an output from the table cell sizing code segment consists of logical height and logical width measurements and the logical height measurement is returned to the table sizing code segment as the acceptable maximum width table cell.

8. The method of claim 6, where the empirically determined number N is empirically determined based on the average number of characters in a vertical line in print or other popular media that typically displays that character set.

9. The method of claim 6, where said determining a maximum distance that characters will be allowed to flow in the character flow direction is increased to the greater of the longest object logical width or the empirically determined number N multiplied by the average character logical width.

10. The method of claim 6, where the table sizing code segment causes the table cell sizing code segment to size the given table cell element cell at a proposed physical width input greater than or equal to the logical height returned to the table sizing code segment as the maximum acceptable width table cell, and an output of the table cell sizing code segment using the proposed physical width input comprises a new logical height and a new logical width measurements, which are returned to the table cell sizing code segment, the new logical height returned as physical width, and the new logical width returned as physical height.

11. A method for auto-sizing textual mark-up language table cells with a vertical character flow property, the method comprising:

determining that a table cell has the vertical character flow property;

estimating a logical width for input to a table cell sizing method designed to auto-size a table cell with the horizontal character flow property; and calling the table cell sizing method with the estimated logical width input in order to auto-size the table cell with the vertical character flow property;

wherein the estimated logical width is determined by, dividing the area of a minimum logical height rectangle by a physical width proposed by a table sizing method, dividing the area of a maximum logical height rectangle by a physical width proposed by a table sizing method, or summing the areas of a minimum logical height rectangle with a maximum logical height rectangle, and dividing that sum by twice a physical width proposed by a table sizing method.

12. The method of claim 11, where an output from a call to the table cell sizing method is examined and a determination is made as to whether a resulting logical height measurement output is within a minimum acceptable error of a physical width proposed by the table sizing method.

13. The method of claim 11, where if a returned actual logical height output is within an acceptable minimum error of a physical width proposed by the table sizing method, the actual logical width output is returned to the table sizing method as a physical height, and a returned logical height output is returned to the table sizing method as a physical width.

14. In a computer system with a textual mark-up language engine, a parent textual mark-up language element with a horizontal character flow property, a child textual mark-up language element with a vertical character flow property, a method for determining a proposed logical width dimension, the method being given a proposed physical width, a desired layout area, and the child element, the method comprising:

determining an area of a minimum logical height rectangle for the child element;

determining a proposed logical width by summing the areas of the determined maximum logical height rectangle and the determined minimum logical height rectangle and dividing the sum by approximately twice the proposed physical width.

15. The method of claim 14, where the determined proposed logical width is set at the greater of itself or the value determined by dividing the area of the determined minimum logical height rectangle area by the proposed physical width.

16. The method of claim 14, where the determined proposed logical width value is altered, the method comprising:

determining an average character logical width value for a language character set by accessing a table containing a value for the language character set;

obtaining a subtracted value by subtracting the integer value one from the determined proposed logical width value;

obtaining a divided value by dividing the subtracted value by the determined average character logical width value;

obtaining an added value by adding the integer value one to the divided value; and obtaining a new proposed logical width by multiplying the added value by the determined average character logical width value.

17. The method of claim 14, wherein determining an area of a minimum logical height rectangle for the child element comprises:

flowing each paragraph or sentence in the child element into a single line in the character flow direction;

obtaining an actual logical width of a minimum logical height rectangle by measuring a length of a longest line in the child element in the character flow direction;

obtaining an actual logical height of a minimum logical height rectangle by finding and summing the measurements of each character or object in each said line that that occupies the most space in the direction perpendicular to the character flow direction and adding a minimal space between lines to improve readability; and multiplying the obtained actual logical height by the obtained actual logical width.

18. The method of claim 14, wherein determining an area of a maximum logical height rectangle for the child element comprises:

setting a maximum logical width for the maximum logical height rectangle;

flowing the child element into the maximum logical height rectangle in a line in the character flow direction so long as no next character or object in the content element being flowed into the line would cause the length of the line to exceed the set maximum logical width;

starting a new line next to and parallel to the previous line and flowing the content element into that line each time the next character or object in the child element would cause the line then being flowed into the rectangular area to exceed the set maximum logical width;

obtaining an actual logical width of the maximum logical height rectangle by finding and measuring a length of the longest line in the character flow direction;

obtaining an actual logical height of the minimum logical height rectangle by finding and summing the measurements of each character or object in each said line that occupies the most space in the direction perpendicular to the character flow direction and adding a minimal space between lines to improve readability; and multiplying the obtained actual logical height by the obtained actual logical width in order to determine the area of the maximum logical height rectangle.

19. A computer readable medium having stored thereon instructions operational to auto-size a vertical character flow textual mark-up language element within an area of an output device, the instructions comprising:

a first program module designed to accept a request to auto-size textual mark-up language elements;

a second program module designed to accept requests to auto-size a textual mark-up language element with the horizontal character flow property at a requested horizontal width;

a third program module designed to alter the request made to the second program module by the first program module so that while the second program module continues to operate as it would for a textual mark-up language element with the horizontal character flow property, the second program module is actually auto-sizing a textual mark-up element with the vertical character flow property and the resulting auto-sized textual mark-up language element is returned to the first program module within the rectangular area within an acceptable error of the requested horizontal width.

20. A computer readable medium having stored thereon instructions operational to auto-size a textual mark-up language table element within an area of an output device, a first program module designed to auto-size a textual mark-up language table element, a second program module designed to accept a request from the first program module to determine the minimum and maximum table cell element width measurements, a third program module that affects the results of the request made by the first program module to the second program module whenever the request to determine the minimum and maximum table cell element width measurement is for a table cell element with the vertical character flow property, the instructions comprising:

instructions affecting the results of the minimum table cell element width measurement by altering the input to the second program module so that characters are allowed to flow in the character flow direction until all characters in each paragraph flow into a single line in the character flow direction;

instructions affecting the results of the maximum table cell element width measurement by altering the input to the second program module so that each time characters flowed into a line in the character flow direction exceed approximately N characters, a new line in the character flow direction is started immediately next to and parallel to the previous line;

wherein the first module is designed to request auto-sizing of table cell elements with the horizontal character flow property and the third module alters inputs of the first module's requests to the second module when the request is to auto-size a table cell element with the vertical character flow property.

21. The computer readable medium of claim 20, wherein the instructions of the second program module are operational to determine the dimensions occupied by a table cell element, the instructions comprising:

determining a minimum width table cell element's height and width dimensions by measuring the table cell element after the contents of each paragraph within the table cell element are flowed into a single line in the character flow direction;

determining a maximum width table cell element's height and width dimensions by measuring the table cell element after the contents of the table cell element are flowed into a line in the character flow direction and when each line exceeds approximately N characters, a new line in the character flow direction is started immediately next to and parallel to the previous line; and returning the maximum and minimum width table cell element's height and width dimensions to the third program module.

22. The computer readable medium of claim 21, wherein the instructions of the third program module are operational to change the logical perspective of the maximum and minimum table cell element height and width dimensions, the instructions comprising:

obtaining from the second program module the maximum width table cell element's height and width dimensions and returning the height dimension to the first program module as the maximum table cell width; and obtaining from the second program module the minimum width table cell element's height and width dimensions and returning the height dimension to the first program module as the minimum table cell width.

23. A computer readable medium having stored thereon instructions operational to auto-size a textual mark-up language table element on an output device, a first program module designed to auto-size a textual mark-up language table element, a second program module designed to accept a request from the first program module to auto-size a textual mark-up language table cell element at a proposed width, a third program module that affects the results of the request made by the first program module to the second program module whenever the request to auto-size a textual mark-up language table cell element at a proposed width is for a table cell element with a vertical character flow property, the instructions comprising:

determining that a table cell element has the vertical character flow property;

estimating a distance to allow characters to flow in the character flow direction, so that when the contents of the table cell element are flowed into the table cell element at the estimated distance, the resulting distance perpendicular to the character flow direction is within an acceptable error of the proposed width;

wherein the second module is designed to receive requests to auto-size table cell elements with a horizontal character flow property and the third module alters an input of a request from the first module to the second module when the request is to auto-size a table cell element with the vertical character flow property.

24. The computer readable medium of claim 23, wherein the second program module flows the table cell element at the estimated distance in the character flow direction, and the third program module returns the flowed table cell element to the first program module rotated ninety degrees clockwise.

25. The computer readable medium of claim 23, wherein the instructions of the third program module are operational in estimating the distance to allow characters to flow in the character flow direction for the table cell, the instructions comprising:

summing the areas of a minimum width table cell element and a maximum width table cell element and dividing the sum by twice the proposed width.

26. A system for rendering textual mark-up language elements with the vertical character flow property on an output device, the system comprising:

a first object designed to accept a request to auto-size textual mark-up language elements;

a second object designed to accept requests to auto-size a textual mark-up language element with the horizontal character flow property at a defined horizontal width; and a third object designed to alter the request made to the second object by the first object so that while the second object continues to operate as it would for a textual mark-up language element with the horizontal character flow property, the second object is actually auto-sizing a textual mark-up element with the vertical character flow property and the resulting auto-sized element is returned to the first object rotated ninety degrees clockwise.

27. A system for rendering textual mark-up language elements with the vertical character flow property on an output device, a first object designed to auto-size a textual mark-up language table element, a second object designed to accept a request from the first object to determine a minimum and maximum table cell element width measurement, a third object that affects the results of the request made by the first object to the second object whenever the request to determine the minimum and maximum table cell element width measurements is for a table cell element with the vertical character flow property, the system comprising:

the third object altering the minimum table cell width request to the second object so that characters are allowed to flow in the character flow direction until all characters in each paragraph flow into a single line in the character flow direction, and the second object returns the resulting height and width measurements of the table cell element to the third object, the returned width measured in the direction parallel to the character flow direction, and the returned height measured in the direction perpendicular to the character flow direction, and the third object forwards the returned height measurement to the first object as the measurement for the minimum table cell width; and the third object altering the maximum table cell width request to the second object so that each time characters flowed into a line in the character flow direction exceeds approximately N characters, a new line in the character flow direction is started immediately next to and parallel to the previous line, and the second object returns the resulting height and width measurements of the table cell element to the third object, the returned width measured in the direction parallel to the character flow direction, and the returned height measured in the direction perpendicular to the character flow direction, and the third object forwards the returned height measurement to the first object as the measurement for the maximum table cell width.

28. The system of claim 27, wherein based on the minimum and maximum table cell widths forwarded to the first object by the third object for the table cell element, the first object later requests auto-sizing of the table cell element at a proposed width, the system comprising:

the third object estimating a distance in the character flow direction to flow the contents of the table cell element so that the resulting table cell element measurement in the direction perpendicular to the character flow direction is within an acceptable error of the proposed width;

the second object then flows the contents of the table cell element in the character flow direction at the estimated distance and then measures the table cell element dimensions;

the third object then compares the flowed table cell element dimensions to the requested width, and if the table cell element measurement in the direction perpendicular to the character flow direction is within an acceptable error of the proposed width, then the rendered table cell element is forwarded to the first object rotated ninety degrees clockwise.

29. The system of claim 28, wherein the third object re-estimates a distance to flow the characters in the character flow direction followed by the second object re-flowing the contents of the table cell at the re-estimated distance and returning the table cell dimensions to the third object until the third object determines that the table cell measurement in the direction perpendicular to the character flow direction is within an acceptable error of the proposed width, in which case the third object forwards the rendered table cell to the first object rotated ninety degrees clockwise.

30. The system of claim 28, wherein the third object estimating a distance in the character flow direction is estimated by summing the areas of the minimum and maximum width table cells for the table cell being measured and dividing the sum of the areas by twice the proposed width.

* * * * *

UNITED STATES PATENT AND TRADEMARK OFFICE
CERTIFICATE OF CORRECTION

| | |
|---|---|
| PATENT NO. | : 6,981,209 B1 |
| APPLICATION NO. | : 09/670246 |
| DATED | : December 27, 2005 |
| INVENTOR(S) | : Parikh et al. |

It is certified that error appears in the above-identified patent and that said Letters Patent is hereby corrected as shown below:

In column 1, line 40, delete "Is" and insert -- is --, therefor.

In column 4, line 25, delete "heeds" and insert -- needs --, therefor.

In column 9, line 18, after "$P \geq LH_{min}$" delete ",".

In column 9, line 54, after "$LH_{max}$" delete ",".

In column 9, line 67, after "width" insert -- P 771. --.

In column 11, line 2, after "follows:" delete ",".

In column 11, line 27, after "($LW_{start}$, $LH_{start}$" delete ",".

In column 14, line 22, in Claim 1, after "case" insert -- of --.

In column 14, line 31, in Claim 1, after "case" insert -- of --.

In column 15, line 27, in Claim 6, after "width input" insert -- . --.

In column 15, line 44, in Claim 10, after "element" delete "cell".

In column 15, line 49, in Claim 10, delete "measurements" and insert -- measurement --, therefor.

In column 16, line 28, in Claim 14, after "element;" insert -- determining an area of a maximum logical height rectangle for the child element; --.

UNITED STATES PATENT AND TRADEMARK OFFICE
CERTIFICATE OF CORRECTION

PATENT NO. : 6,981,209 B1
APPLICATION NO. : 09/670246
DATED : December 27, 2005
INVENTOR(S) : Parikh et al.

It is certified that error appears in the above-identified patent and that said Letters Patent is hereby corrected as shown below:

In column 16, line 67, in Claim 17, delete "that" before "occupies".

Signed and Sealed this

Eighteenth Day of August, 2009

David J. Kappos
*Director of the United States Patent and Trademark Office*